Aug. 14, 1951 W. E. PUGH 2,564,128
METHOD AND APPARATUS FOR UNDERWATER SEISMIC PROSPECTING
Filed June 27, 1947
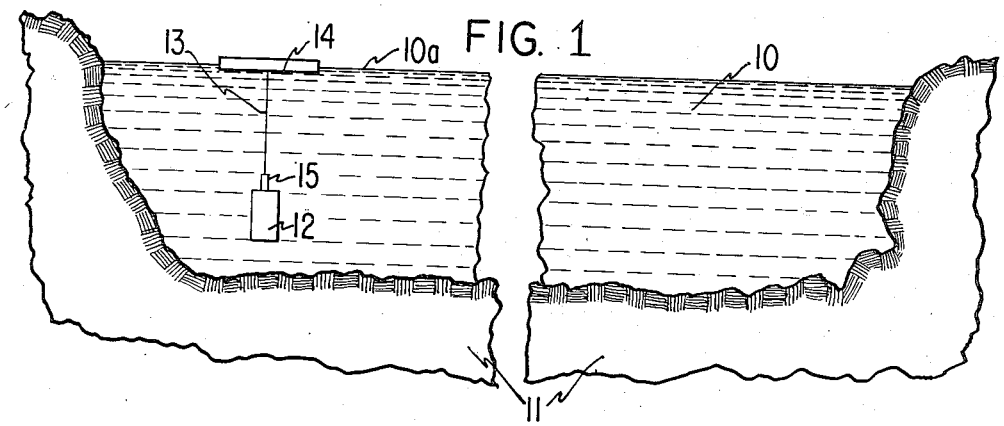
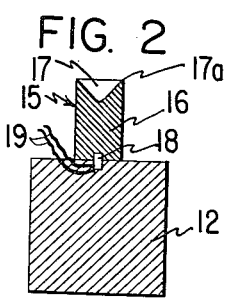
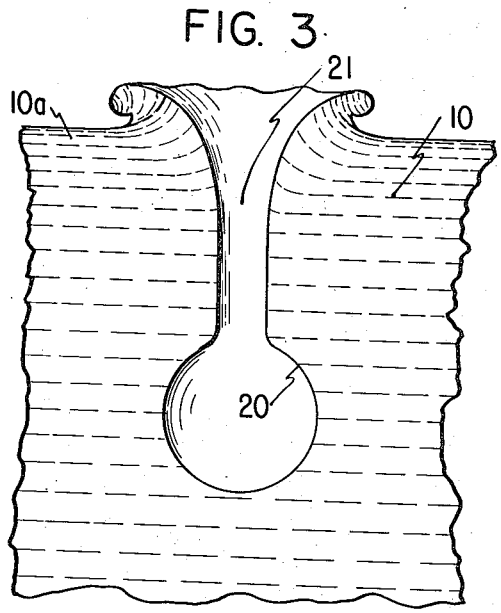
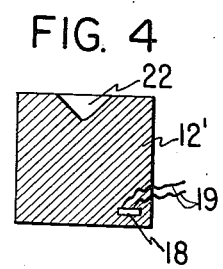
INVENTOR.
William E. Pugh
BY
Richard D Mason
Attorney Patented Aug. 14, 1951

2,564,128

UNITED STATES PATENT OFFICE 2,564,128

METHOD AND APPARATUS FOR UNDERWATER SEISMIC PROSPECTING

William E. Pugh, Tulsa, Okla., assignor to Seismograph Service Corporation, Tulsa, Okla., a corporation of Delaware Application June 27, 1947, Serial No. 757,542

3 Claims. (Cl. 181—0.5)

The present invention relates to methods and apparatus for geophysical prospecting over water-covered areas and more particularly to improved methods and apparatus for generating seismic waves beneath the surface of a body of water.

Seismic methods of geophysical prospecting involve the use of explosive charges at a succession of shot points to generate seismic waves which are propagated downward through the earth from each shot point and then reflected and refracted from strata interfaces and the like in the earth to a plurality of wave detectors laterally displaced from the shot point. In practicing such methods over water-covered areas, it is necessary to detonate each explosive charge beneath the surface of the water in order to obtain effective utilization of the explosive energy developed. This gives rise to the problem of suppressing or preventing the generation of unwanted so-called secondary and following P waves which are normally generated at short intervals after the desired so-called primary P waves. It is believed that the unwanted P waves are caused by the collapse and initial reformation of the substantially spherical cavity formed in the water when the explosion takes place at such a depth that there is no surface blow-out above the charge, and also by the compression and expansion of the gas released by the shot as this gas rises to the surface. Some authorities believe and certain tests have indicated that the secondary and following P waves are not generated if the explosion is controlled to produce a non-spherical cavity in the water. Regardless of the validity of this theory, when the secondary and following P waves are generated, they travel with essentially the same velocity as the primary P waves. This gives rise to several problems. One problem arises from the fact that the secondary and following P waves may produce reflections from one sub-surface horizon which are detected by the detectors at a time which could mistakenly be interpreted as the arrival time of primary wave reflections from a deeper horizon. Also, the non-primary wave reflections from the shallower horizons may arrive at the detectors at the same time as primary wave reflections from a deeper horizon if the relative depths of the two horizons happen to be right with the result that a confused reflection record is obtained. Further, direct transmission of the secondary and following P waves to the detectors may interfere with concurrently arriving and desired primary wave reflections from a sub-surface horizon, thereby producing confusion of the reflection record.

It is an object of the present invention, therefore, to obviate the problem outlined above in the generation of seismic waves beneath the surface of a body of water.

It is another object of the invention to provide an improved method and apparatus for effectively generating seismic waves beneath the surface of a body of water without generating undesired secondary and following (non-primary) P waves.

According to still another object of the present invention, the maintenance of critical relationships between the size and type of explosive charge and the depth of the charge in the water is avoided in the present improved apparatus and method while achieving the desired end of preventing the generation of undesirable secondary and following P waves.

It is another object of the invention to provide apparatus for generating seismic waves beneath the surface of a body of water which is so arranged that a non-spherical cavity is formed in the water incident to detonation of the explosive charge of the apparatus.

It is a further object of the invention to increase the seismic efficiency per unit charge of explosive used in the generation of seismic waves beneath the surface of a body of water.

It is a still further object of the invention to provide an improved method and improved apparatus for so generating seismic waves beneath the surface of a body of water that floating of the explosive charge is not required.

In accordance with the present invention, the above objects are realized by detonating a charge beneath the surface of the water while concentrating and directing toward the surface of the water at least a portion of the explosive energy resulting from the detonation, thereby to open a gas escape path between the surface of the water and the submerged explosion zone.

Further objects and advantages of the present invention will become apparent as the following description proceeds, and the features of novelty which characterize the invention will be pointed out with particularity in the claims annexed to and forming a part of this specification.

For a better understanding of the invention, reference may be had to the accompanying drawings in which:

Fig. 1 is a fragmentary sectional view taken vertically through a body of water to illustrate the apparatus employed in connection with the present invention;

Fig. 2 is a detailed sectional view of the explosive charge of one modification of the present invention;

Fig. 3 is a sectional view illustrating the manner in which the water is displaced upon detonation of the charge of the type shown in Fig. 2 of the drawing in the position illustrated in Fig. 1 of the drawing, and Fig. 4 is a sectional view similar to Fig. 2 illustrating another modification of the present invention.

Referring now to the drawing, there is illustrated a body of water 10 overlying a portion of the earth's crust 11 which it is desired to explore by seismic prospecting methods. To accomplish this it is necessary to detonate explosive charges beneath the surface 10a of the body of water 10 to generate seismic waves which are propagated downward through the portion of the earth's crust 11 and then reflected and refracted from strata interfaces and the like beneath the surface of the portion of the earth's crust 11. These reflected and refracted waves can be received by suitable detectors located at various points with respect to the point of detonation of the charge beneath the surface 10a of the body of water 10. In Fig. 1 there is schematically illustrated an explosive charge 12 which is located well beneath the surface 10a of the body of water 10. The explosive charge 12 is preferably supported by suitable means generally indicated at 13 from a float such as 14 located at the surface 10a of the body of water 10. With this arrangement the explosive 12 may be positioned at any desired depth below the water's surface and furthermore in any position relative to the body of water itself. For reasons apparent from the following explanation, the charge 12 may, however, be dropped to the bottom of the body of water, if desired. It will be understood that the supporting means 13 also includes means for exploding the explosive charge 12. It may, for example, comprise fuse wires connected to a suitable fuse disposed in the charge 12 which fuse wires extend to the float 14 from which they may lead to any suitable detonating means positioned at a safe distance from the point of explosion. Generally electrical means are provided for igniting these fuse wires to detonate the charge which will be apparent to those skilled in the art.

Upon detonation of the charge 12 a substantial amount of gas is developed beneath the surface of the water which cannot immediately escape through the overlying layers of water. Immediately incident to the detonation of the charge the explosive forces give rise to the generation of the desired primary P waves, a portion of which are propagated downwardly through the water and the underlying sub-surface structure as was mentioned above for reflection and refraction from sub-surface horizons to conventional seismic wave detectors which are not shown but which are laterally displaced from the shot point in the customary manner. After these waves have been generated, the gas bubble which is formed in the body of water 10 at the shot point starts to collapse, and it is the collapsing of this bubble which causes the release of sufficient energy to generate the undesired secondary P waves. The subsequent action is thought to be somewhat oscillatory in the sense that the gas bubble reexpands and recollapses a number of times to produce additional P waves. However, as the phenomenon proceeds the amplitude of the waves rapidly decreases and after the third or fourth wave pulses become unobjectionable. The P waves caused by the first few impulses, however, are propagated downwardly at the same velocity as the primary P waves and are of sufficient magnitude to produce the undesirable results referred to above.

Heretofore, it was found necessary accurately to correlate the amount of the charge, the strength of the explosive, and the depth of the charge in the body of water so that the explosive force of the charge when fired was sufficient to open a gas escape path between the surface of the water and the explosion zone. In accordance with the present invention, however, such careful correlation may be dispensed with entirely and instead the so-called "bubble effect" is eliminated by connecting to the explosive charge 12 as shown in Fig. 2 of the drawing a prepared cavitated charge 15 which comprises an explosive charge including explosive material 16 which does not entirely fill the container of the explosive charge 15. Consequently there is defined a cavity 17 therein. This cavity is illustrated as being formed at the end of the charge 15 (which might be referred to as the auxiliary charge if it is considered that the explosive charge 12 is the primary charge) which points toward the surface of the water. This cavity may be of conical configuration as shown or of semispherical configuration to make use of the so-called "Munroe effect" of producing an explosive jet which is concentrated around the axis of the cavity 17 and in a direction away from the cavity which in the arrangement described will be toward the surface of the water. A suitable fuse 18 for detonating the explosive charges and fuse wires 19 leading to the surface of the water as was described above are illustrated in Fig. 2 of the drawing. It will be understood that the cavity 17 is principally defined by the provision of a suitable liner 17a within the auxiliary charge 15. With the explosive 12 and the auxiliary charge 15 positioned in the manner indicated in Fig. 1 of the drawing, energization of the fuse wires 19 causes energization of the ignition cap or fuse 18 to produce substantially simultaneous detonation of the main charge 12 and the auxiliary cavitated charge 15. As the main charge 12 and the auxiliary charge 15 explode, the desired primary P waves are generated and a large gas bubble is formed beneath the surface 10a of the body of water 10. Detonation of the auxiliary charge 15, however, causes a concentrated and directed blast of explosive energy toward the surface 10a of the body of water 10 so that a gas escape path or channel of relatively small diameter is formed between the surface 10a of the water and the explosion zone or gas bubble of the exploding main and auxiliary charge. Thus, a non-spherical cavity is formed in the body of water with the possible attendant advantages referred to above. This phenomenon is illustrated in Fig. 3 of the drawing where the gas bubble 20 is illustrated together with the escape path 21 leading from the gas bubble to the surface of the water. By virtue of the jet explosive effect or concentrated directed energy of the auxiliary charge 15, the channel or escape path 21 is maintained for a brief period of time sufficiently long to permit the gases to escape to the surface whereby the gas bubble 20 disappears without producing the so-called secondary P waves which have produced such undesirable effects heretofore.

It is emphasized that the explosive jet developed upon detonation of the two charges 12 and 15 in a direction toward the surface of the water is very powerful and is easily capable of opening a gas escape path 21 through a considerable depth of water when charges 12 and 15 of reasonable size are used. Hence, in most water covered areas having water depths of the order of magnitude ordinarily encountered in practice, it is not necessary to float the charges from the surface of the water since the jet effect will insure opening of a gas escape path to the water surface with the charges disposed at the bottom of the water. If such is the practice, any suitable means may be used to retain each charge in an upright position with the cavity 17 pointing toward the water's surface.

It will be understood that the same effect can be produced by dispensing with the auxiliary charge 15 and instead providing in the main charge which is designated at 12' in Fig. 4 of the drawings a suitable cavity 22 formed in the upper portion thereof. This cavity may be defined by forcing or placing a metallic, plastic, or other conical-shaped member into the top of the regular charge. The fuse 18 and the fuse wires 19 are designated by the same reference numerals in Fig. 4 of the drawing as used in Fig. 2. The well-known "Munroe effect" causes a powerful jet of explosive energy to be directed in an upward vertical direction when the cavity 22 is disposed on the upward side of the charge 12'. This explosive jet is sufficient to penetrate the water's surface and hence furnish an outlet for the gases emanated by the explosion. It will be understood that the arrangement disclosed in Fig. 4 will function in substantially the same manner as that described in connection with Fig. 2.

From the foregoing explanation it will be understood that the present improved method provides a simple and effective solution to the problem of preventing non-primary P waves from being generated incident to the detonation of an explosive charge beneath the surface of a body of water. Further, the solution is such that any critical relationship between material and size of the charge and the depth of this charge beneath the water's surface is avoided. Consequently, a smaller dynamite charge may be used at a much greater depth than was heretofore possible. In addition, a greater over-all seismic efficiency will be obtained per unit charge of dynamite due to the fact that much greater depths may be used. Most important, the interpretation of the seismic records obtained will be improved greatly due to the elimination of the interfering secondary P waves. Aside from the above, it will also be understood that the arrangement employed is simple in the extreme and that each unit of equipment may be easily assembled and handled in the placement of the unit at the desired shot points.

It will be apparent to those skilled in the art that the present invention is not limited to the particular method described and construction shown but that changes and modifications may be made without departing from the spirit and scope of the present invention. It is aimed in the appended claims to cover all such changes and modifications.

What is claimed as new and desired to be secured by Letters Patent of the United States:

1. Apparatus for generating seismic waves beneath the surface of a body of water while substantially preventing the generation of undesired non-primary waves, comprising explosive means including a portion provided with a cavity for concentrating and directing toward the surface of the water at least a portion of the explosive energy resulting from detonation of said explosive means, means for supporting said explosive means beneath the surface of the water with said cavity facing the water's surface, and means for detonating said explosive means.

2. Apparatus for generating seismic waves beneath the surface of a body of water while substantially preventing the generation of undesired non-primary waves, comprising a main charge of explosive material for generating the desired waves upon detonation thereof, an auxiliary charge of explosive material positioned at the side of said main charge and provided with a cavity for concentrating and directing along a predetermined path the explosive energy developed upon detonation of at least one of said charges, means for supporting said charges beneath the surface of a body of water with said cavity facing the water's surface, and means for detonating said charges.

3. Apparatus for generating seismic waves beneath the surface of a body of water while substantially preventing the generation of undesired secondary waves, comprising a main charge of explosive material for generating the desired waves upon detonation thereof, an auxiliary charge engaging said main charge along one side of said main charge and provided with a cavity for concentrating and directing along a predetermined path the explosive energy developed upon detonation of said auxiliary charge, means for supporting said charges beneath the surface of a body of water with said cavity facing the water's surface, and means including a fuse interposed between said charges for detonating said charges.

WILLIAM E. PUGH.

REFERENCES CITED

The following references are of record in the file of this patent:

UNITED STATES PATENTS

| Number | Name | Date |
| --- | --- | --- |
| 1,548,068 | Alexander | May 11, 1926 |
| 2,351,524 | Lay et al. | June 13, 1944 |
| 2,399,211 | Davis | Apr. 30, 1946 |

OTHER REFERENCES

Article, "The Shaped Charge," by V. Torrey, "The Explosives Engineer," July-August 1945, pages 160–163.